United States Patent
Moore et al.

(10) Patent No.: US 11,525,904 B2
(45) Date of Patent: Dec. 13, 2022

(54) DYNAMIC LATCH BASED SPAD FRONT END

(71) Applicant: STMicroelectronics (Research & Development) Limited, Marlow (GB)

(72) Inventors: John Kevin Moore, Edinburgh (GB); Neale Dutton, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 465 days.

(21) Appl. No.: 16/661,119

(22) Filed: Oct. 23, 2019

(65) Prior Publication Data
US 2021/0124032 A1    Apr. 29, 2021

(51) Int. Cl.
*G01C 3/08*     (2006.01)
*G01S 7/4913*   (2020.01)
*G01S 17/32*    (2020.01)
*G01S 7/48*     (2006.01)

(52) U.S. Cl.
CPC .......... *G01S 7/4913* (2013.01); *G01S 7/4808* (2013.01); *G01S 17/32* (2013.01)

(58) Field of Classification Search
CPC ....... G01S 7/4913; G01S 7/4808; G01S 17/32
See application file for complete search history.

(56) References Cited

U.S. PATENT DOCUMENTS

| | | | |
|---|---|---|---|
| 2005/0146705 A1* | 7/2005 | Lei | G01S 7/487 356/5.01 |
| 2013/0300838 A1 | 11/2013 | Borowski | |
| 2014/0021356 A1 | 1/2014 | Zwaans et al. | |
| 2015/0041625 A1 | 2/2015 | Dutton et al. | |
| 2016/0284743 A1 | 9/2016 | Mellot et al. | |
| 2018/0123611 A1 | 5/2018 | Dutton et al. | |
| 2018/0195900 A1* | 7/2018 | Delic | G01J 1/44 |
| 2020/0179105 A1* | 6/2020 | Waterhouse | A61F 2/1691 |

FOREIGN PATENT DOCUMENTS

| CN | 107247272 A | * 10/2017 | ............ G01S 17/08 |
|---|---|---|---|
| WO | WO 2020127927 A1 | * 6/2020 | ........... G01S 17/894 |

OTHER PUBLICATIONS

Erdogan, Ahmet T., et al.: "A CMOS SPAD Line Sensor with per-pixel Histogramming TDC for Time-Resolved Multispectral Imaging," IEEE Journal of Solid-State Circuits, 2019, 54 (6), pp. 1705-1719.

* cited by examiner

*Primary Examiner* — Mark Hellner
(74) *Attorney, Agent, or Firm* — Crowe & Dunlevy

(57) ABSTRACT

A time-of-flight ranging system disclosed herein includes a receiver asserting a photon received signal in response to detection of light that has reflected off a target and returned to the time-of-flight ranging system. A first latch circuit has first and second data inputs receiving a first pair of differential timing references, the first latch circuit latching data values at its first and second data inputs to first and second data outputs based upon assertion of the photon received signal. A first counter counts latching events of the first latch circuit during which the first data output is asserted, and a second counter counts latching events of the first latch circuit during which the second data output is asserted. Processing circuitry determines distance to the target based upon counted latching events output from the first and second counters.

39 Claims, 10 Drawing Sheets

DYNAMIC LATCH BASED SPAD FRONT END

TECHNICAL FIELD

This disclosure is related to the field of time of flight sensing, and, more particularly, to the use of a dynamic latch based single photon avalanche detector (SPAD) front end for counting detections of ranging light photons that have reflected off a target and impinged upon the SPAD.

BACKGROUND

Time-of-flight systems are used to measure distance to a target. There are two general classifications of time-of-flight systems, namely direct and indirect.

With direct time-of-flight systems, a laser diode (typically infrared) is driven with a pulsed drive current to cause it to emit a short laser pulse in a given direction. This laser pulse is reflected by a possible object in that given direction, and a receiver receives and reads the reflected laser pulse. The receiver, with a proper timing reference, measures the elapsed time between emitting the laser pulse and receipt of the reflected laser pulse. From this elapsed time, the distance to the object can be evaluated.

With indirect time-of-flight systems, a laser diode (typically infrared) is continuously modulated to emit sinusoidal laser light in a given direction. This modulated sinusoidal laser light is reflected by a possible object in the given direction, and a receiver receives and reads the reflected sinusoidal laser light. The receiver compares the phase difference between the reflected sinusoidal laser light and the emitted sinusoidal laser light, and from this phase difference, the distance to the object can be determined.

In some applications, it is desirable for the receiver to include a large array of single photon avalanche diodes (SPADs). However, when the receiver includes a large array of SPADs, all timing references for the array are driven as full swing signals driven in or out of the array, which consumes excessive power due to the continuous charging and discharging of capacitances from the routing and readout circuitry within the receiver. An additional issue with this scheme is that proper function is dependent on the array remaining free of supply and ground disturbances, which can alter the timing references and therefore cause inaccurate results.

This excess power consumption is clearly undesirable in applications where power for the time-of-flight ranging system is provided by a battery, or where limited power is available.

Therefore, further development is needed in this area.

SUMMARY

Disclosed herein is a time of flight ranging system including a receiver configured to assert a photon received signal in response to detection of light that has reflected off a target and returned to the time of flight ranging system, and a first latch circuit having first and second data inputs receiving a first pair of differential timing references. The first latch circuit is configured to latch data values at its first and second data inputs based upon assertion of the photon received signal.

The first latch circuit may latch data values at its first data input to a first data output. In this instance, the first latch circuit may include a first counter configured to count latching events of the first latch circuit during which the first data output is asserted, and a second counter configured to count latching events of the first latch circuit during which an inversion of a voltage at the first data output is asserted.

The first latch circuit may latches data values at its first and second data inputs to first and second data outputs. In this instance, the first latch may include a first counter configured to count latching events of the first latch circuit during which the first data output is asserted, and a second counter configured to count latching events of the first latch circuit during which the second data output is asserted.

Also disclosed herein is a method of operating a time of flight ranging system. The method includes asserting a photon received signal in response to detection of light that has reflected off a target and returned to the time of flight ranging system, receiving a first pair of differential timing references at first and second data inputs of a first latch circuit, and latching data values at the first and second data inputs of the first latch circuit to first and second data outputs of the first latch circuit based upon assertion of the photon received signal. This method may include counting latching events of the first latch circuit during which the first data output is asserted, and counting latching events of the first latch circuit during which the second data output is asserted.

Generating the photon received signal may include performing an effective logical OR operation on outputs of each of a plurality of single photon avalanche diodes (SPADs).

Another method disclosed herein is a method of operating a time of flight ranging system. The method includes asserting a photon received signal in response to detection of light that has reflected off a target and returned to the time of flight ranging system, receiving a first pair of differential timing references at first and second data inputs of a first latch circuit, and latching data values at the first and second data inputs of the first latch circuit based upon assertion of the photon received signal.

The method may also include counting latching events of the first latch circuit during which the first data output is asserted, and counting latching events of the first latch circuit during which an inversion of the first data output is asserted.

Generating the photon received signal may include performing an effective logical OR operation on outputs of each of a plurality of single photon avalanche diodes (SPADs).

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
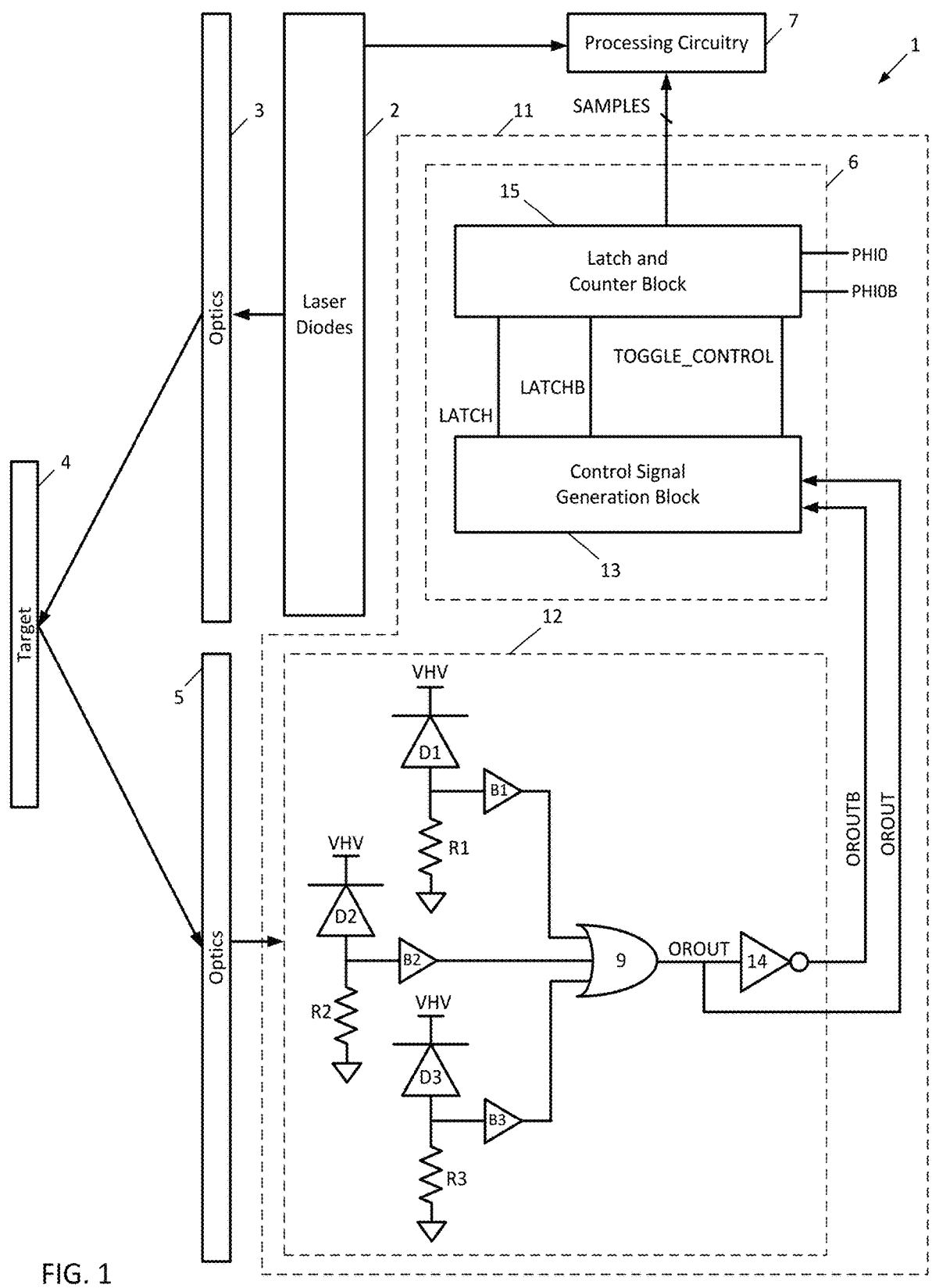
FIG. 1 is a block diagram of an indirect time of flight (iTOF) ranging system in accordance with this disclosure.
Figure 2:
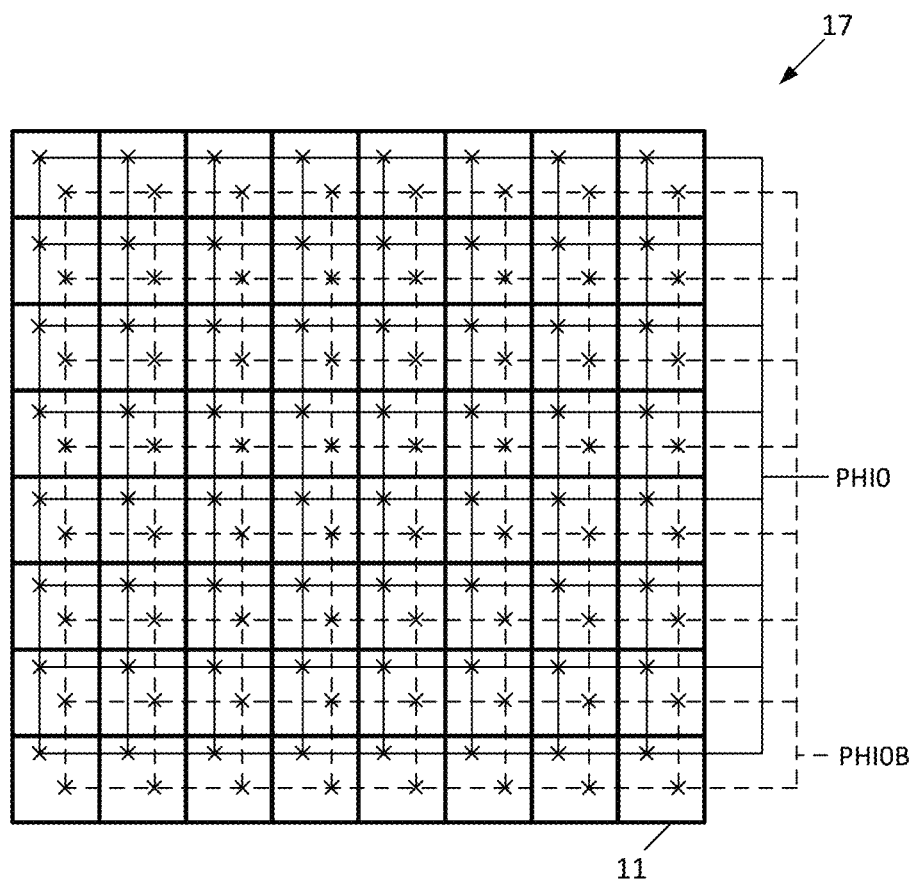
FIG. 2 is a diagrammatical representation of the detection array of FIG. 1.

With reference to FIGS. 1-2, an indirect time of flight (iTOF) ranging system 1 is now described. The indirect time of flight ranging system 1 in this example includes laser diodes 2 that emit continuously modulated sinusoidal laser light that is focused by optics 3 and directed at a target 4, but could use other light emitters such as light emitting diodes instead of the laser diodes. Some of the laser light that strikes the target 4 reflects off the target 4 and returns to the iTOF ranging system 1 through optics 5 to impinge upon single photon avalanche photodiodes (SPADs) D1-D3 of a receiver circuit 12. The receiver circuit 12 is arranged as an OR tree that generates a photon detected signal OROUT that is asserted when one or more of the SPADs D1-D3 is struck by an incoming laser photon that has reflected off the target 4 and returned to the iTOF ranging system 1, but otherwise remains deasserted. As will be explained in great detail below, the receiver circuit 12 includes a latch that has dual data inputs receiving a differential timing reference signal that is enabled (caused to latch) in response to assertion of OROUT, and a counter that counts the number of latching events, then provides this value as the SAMPLES signal to processing circuitry 7. The SAMPLES signal is used by the processing circuitry 7 as representing samples of the amplitude of the reflected laser light over different phases of a period of the reflected laser light. Using the SAMPLES signal, the phase of the reflected laser light can be compared to the phase of the continuously modulated sinusoidal laser light emitted by the laser diodes 2 for determining the distance between the iTOF ranging system 1 and the target 4.

In greater detail, the receiver circuit 12 is arranged as an OR tree. As shown, the OR tree includes SPAD D1 having its cathode coupled to a high voltage node VHV and its anode coupled to ground through a resistor R1, with the anode of SPAD D1 also being coupled to the input of OR gate 9 through buffer B1. Similarly, SPAD D2 has its cathode coupled to the high voltage node VHV and its anode coupled to ground through resistor R2, with the anode of SPAD D2 also being coupled to the input of OR gate 9 through buffer B2. Likewise, SPAD D3 has its cathode coupled to the high voltage node VHV and its anode coupled to ground through resistor R3, with the anode of SPAD D3 also being coupled to the input of OR gate 13 through buffer B3. It should be understood that this illustrated OR tree is a simplified example shown for ease of understanding, and that in actual embodiments there may be many more SPADs with nested OR gates, with any configuration being possible that produces an asserted OROUT signal when one or more of the SPADs present is struck by an incoming laser photon that has reflected off the target 4 and returned to the iTOF ranging system 1. In addition, it should be understood that but one possible way of suitably biasing the SPADs D1-D3 has been shown, and that the SPADs D1-D3 may be instead be biased in any other fashion (e.g., such as with a negative voltage applied to the anodes of the SPADs D1-D3)—this disclosure is generic to any biasing scheme for the SPADs D1-D3.

The OR gate 13 generates the OROUT signal at its output, with OROUT being asserted when one or more of the SPADs present is struck by an incoming laser photon that has reflected off the target 4 and returned to the iTOF ranging system 1, but otherwise remaining deasserted. An inverter 14 produces a complement of the OROUT signal, labeled as OROUTB.

A front end 6 receives OROUT and OROUTB, counts the number of photon detections over different phases of the reflected laser light based upon processing OROUT and OROUTB, and provides these counts to processing circuitry 7 as SAMPLES. From the SAMPLES signal, the processing circuitry 7 can make determinations of distance between the iTOF ranging system 1 and the target 4.

The front end 6 is comprised of a control signal generation block 13 that receives OROUT and OROUTB, from these signals generates a latch command signal LATCH, a complement of the latch command signal LATCH labeled as LATCHB, and a toggle control signal TOGGLE_CONTROL. The front end 6 also includes a latch and counter block 15 that receives LATCH, LATCHB, and TOGGLE_CONTROL, and from these signals generates the number of photon detections (shown as SAMPLES), which is provided to the processing circuitry 7.

Note that the receiver circuit 12 and front end 6 form a zone 11. One zone 11 is shown in FIG. 1 for ease of illustration and explanation, but it should be understood that there may be multiple such zones 11 in some implementations. As shown in FIG. 2, the zone 11 may be but one zone within a detection array 17, with the detection array 17 containing multiple such zones. In the example shown in FIG. 2, for example, the detection array 17 contains 64 zones arranged into an 8×8 array. In FIG. 1, however, but one zone 11 was depicted for simplicity of drawing and ease of explanation. However, understand that each zone contains an instance of the illustrated receiver circuit 12 and front end 6. The differential timing references PHI0 and PHI0B are provided to each zone 12 within the detection array 17 (with the illustrated lines indicating the provision of PHI0 and PHI0B lines to each zone 12, and the illustrated x's indicating the connection of each zone 12 to the PHI0 and PHI0B lines), as will be explained below in detail together with the purpose served by these differential timing references.

Figure 3:
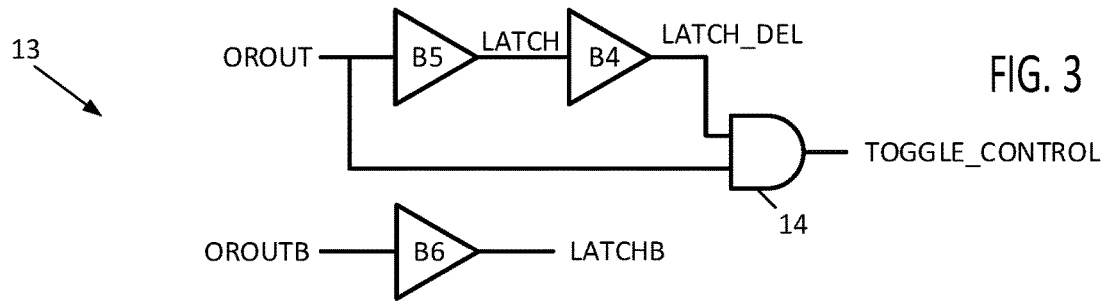
FIG. 3 is a block diagram of the clock signal generation block of FIG. 1.

Further details of the control signal generation block 13 can be seen in FIG. 3. Here, it can be seen that OROUTB is delayed by buffer B6 to produce LATCHB. It can also be seen that OROUT is delayed by buffer B5 to produce LATCH which is delayed by buffer B4 to produce a delayed latch command signal LATCH_DEL, and that AND gate 14 performs a logical AND operation on OROUT and LATCH_DEL to produce the TOGGLE_CONTROL signal.

Figure 4:
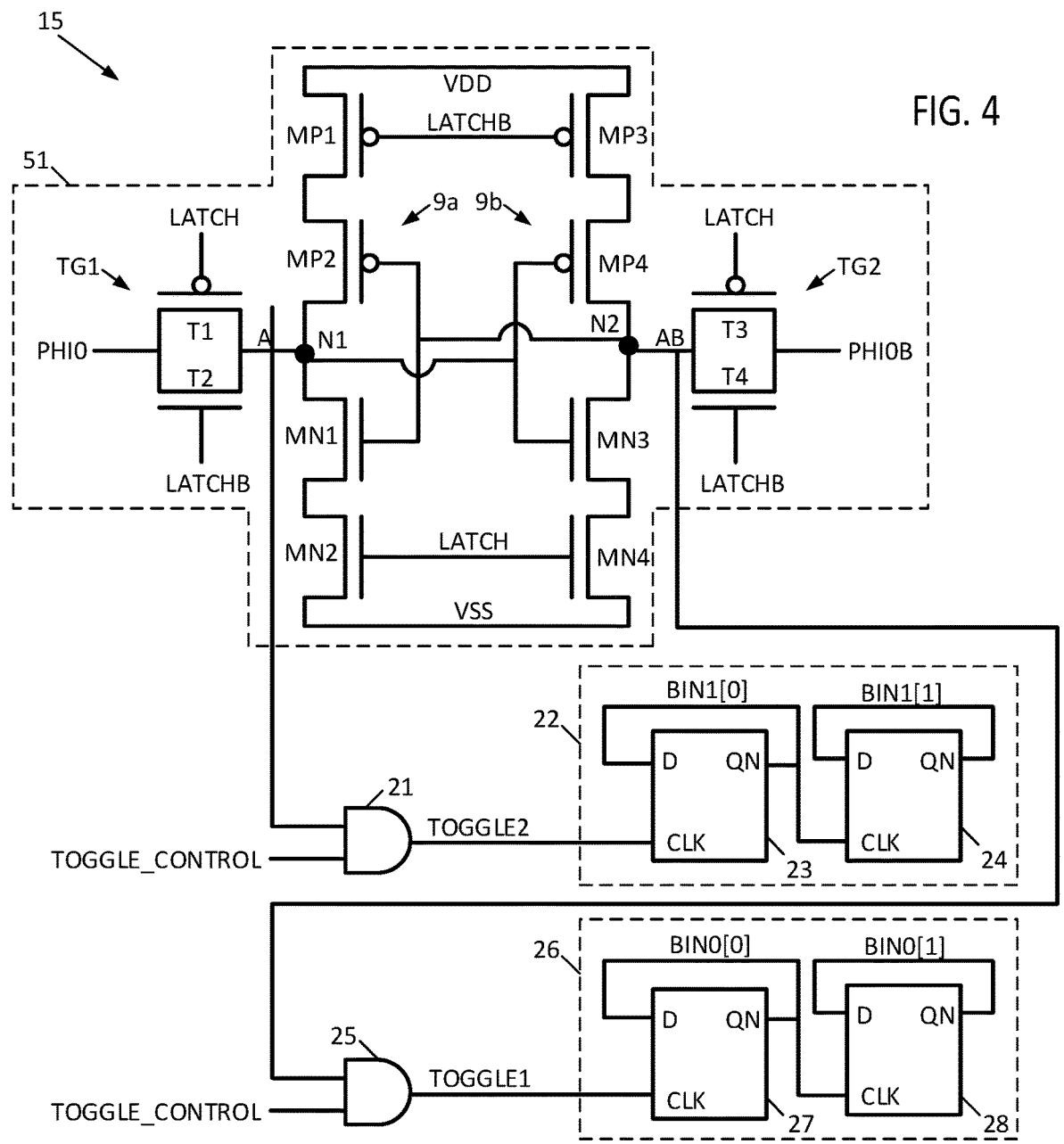
FIG. 4 is a schematic diagram of one latch and counter block 15 such as may be used with the iTOF ranging system of FIG. 1.

Further details of the latch and counter block 15 can be seen in FIG. 4. Here, it can be seen that the latch and counter block 15 includes a dynamic latch 51. The dynamic latch 51 includes a p-channel transistor MP2 and n-channel transistor MN1 that form a first inverter 9a, with the drain of MP2 being coupled to node N1, the drain of MN1 also being coupled to node N1, and the gates of MP2 and MN1 being coupled to one another. It can also be seen that p-channel transistor MP4 and n-channel transistor MN3 form a second inverter 9b, with the drain of MP4 being coupled to node N2, the drain of MN3 also being coupled to node N2, and the gates of MP4 and MN3 being coupled to one another. Note that the coupled gates of MP2 and MN1 form the input of the first inverter 9a and that node N1 forms the output of the first inverter 9a; likewise, the coupled gates of MP4 and MN3 form the input of the second inverter 9b and the node N2 forms the output of the second inverter 9b. Since the input of the first inverter 9a is coupled to the output of the second inverter 9b, while the input of the second inverter 9b is coupled to the output of the first inverter 9a, the inverters 9a and 9b are cross coupled.

P-channel transistors MP1 and MP3 form a supply side enable circuit for the inverters 9a and 9b, while n-channel transistors MN2 and MN4 form a ground side enable circuit for the inverters 9a and 9b. In particular, the source of MP1 is coupled to the supply voltage VDD and the drain of MP1 is coupled to the source of MP2, while the source of MP3 is coupled to the supply voltage VDD and the drain of MP3 is coupled to the source of MP4, and the gates of MP1 and MP3 are both coupled to LATCHB. Similarly, the drain of MN2 is coupled to the source of MN1 and the source of MN2 is coupled to VSS, while the drain of MN4 is coupled to the source of MN3 and the source of MN4 is coupled to VSS, and the gates of MN2 and MN4 are coupled to LATCH.

A first transmission gate TG1 selectively couples the differential timing reference PHI0 to node N1, while a second transmission gate TG2 selectively couples the differential timing reference PHI0B to node N2. The first transmission gate TG1 is comprised of p-channel transistor T1 and n-channel transistor T2 coupled in parallel, with the gate of T1 coupled to LATCH and the gate of T2 coupled to LATCHB. The second transmission gate TG2 is comprised of p-channel transistor T3 and n-channel transistor T3 coupled in parallel, with the gate of T3 coupled to LATCH and the gate of T2 coupled to LATCHB.

A first AND gate 25 has inputs coupled to node N2 and TOGGLE_CONROL, and generates the complement of the toggle signal as TOGGLEB. A ripple counter 26 receives TOGGLEB. The ripple counter 26 is comprised of flip flops 27 and 28, with flip flop 27 receiving TOGGLEB at its clock input CLK and having its D input coupled to its QN output as well as to the clock input CLK of the flip flop 28. The flip flop 28, in addition to having its clock input CLK coupled to the QN output of the flip flop 27, has its D input coupled to its QN output. Note that the state of the QN output of the flip flop 27 stores the BIN0[0] bit, while the state of the QN output of the flip flop 28 stores the BIN0[1] bit.

A second AND gate 21 has inputs coupled to node N1 and TOGGLE_CONROL, and generates the toggle signal TOGGLE. A ripple counter 22 receives TOGGLE. The ripple counter 22 is comprised of flip flops 23 and 24, with flip flop 23 receiving TOGGLE at its clock input CLK and having its D input coupled to its QN output as well as to the clock input CLK of the flip flop 24. The flip flop 24, in addition to having its clock input CLK coupled to the QN output of the flip flop 23, has its D input coupled to its QN output. Note that the state of the QN output of the flip flop 23 stores the BIN1[0] bit, while the state of the QN output of the flip flop 24 stores the BIN1[1] bit.

Note that the ripple counters 22 and 26 are shown as being 2-bit ripple counters, but may in actuality be any number of bits.

Operation of the iTOF ranging system 1 will first be described in general, and then will be described again with reference to a specific operation instance.

In general, in the absence of a detection event, the anodes of the SPADs D1-D3 remain at a logic low, and therefore OROUT is output by the OR gate 13 as low. Since the LATCH signal is a delayed version of the OROUT signal (delayed by the delay in the buffer B5), and since the LATCHB signal is a delayed version of the OROUTB signal (delayed by the delay in the buffer B6), in the absence of a detection event, LATCH remains at a logic low while LATCHB remains at a logic high. Therefore, in the absence of a detection event, transistors MP1, MP3, MN2, and MN4 remain off while the transmission gates TG1 and TG2 remain activated (acting as a short circuit), with the result being that the voltage A at node N1 follows that of PHI0 and the voltage AB at node N2 follows that of PHI0B. Since PHI0 and PHI0B are LVDS (low voltage differential sensing) signals, the total swing between PHI0 and PHI0B is low, such as 0.1V. Consequently, the charge transferred into and from line capacitances by PHI0 and PHI0B in the absence of a detection event is low, so power consumption is low. Note that in the absence of a detection event, TOGGLE_CONTROL as output by the AND gate 14 will be at a logic low because OROUT will be at a logic low, and therefore TOGGLE2 and TOGGLE1 as output by the AND gates 21 and 25 will remain at a logic low, with the result being that the ripple counters 22 and 26 do not increment.

When a detection event occurs, the anodes of the SPAD or SPADs D1-D3 struck by a photon or photons will rise to a logic high, with the result being that OROUT as output by the OR gate 13 rises to a logic high.

Since the LATCH signal is a delayed version of the OROUT signal (delayed by the delay in the buffer B5), and since the LATCHB signal is a delayed version of the OROUTB signal (delayed by the delay in the buffer B6), when the detection event occurs, LATCH rises to a logic high while LATCHB falls to a logic low. Therefore, when the detection event occurs, transistors MP1, MP3, MN2, and MN4 turn on while the transmission gates TG1 and TG2 turn off (acting as an open circuit), with the result being that the voltages at nodes A and AB (which at that point match PHI0 and PHI0B) are latched and raised to a full voltage swing such as 1.2 V (instead of the much lower LVDS swing of 0.1V).

From the above, it should be noticed that the dynamic latch 51 is enabled by the OROUT signal (e.g., is enabled by detection of a photon by one of the SPADs D 1-D3) and that the data inputs to the dynamic latch 51 are the differential timing references PHI0 and PHI0B. Conversely, it can be said that the dynamic latch 51 does not receive an indication of whether a detection event has occurred at either of its data inputs, and it can be said that the dynamic latch is not enabled by one or more clock signals.

Note that due to the detection event, TOGGLE_CONTROL as output by the AND gate 14 will eventually (after the propagation delay introduced by the buffers B5 and B4) rise to a logic high because OROUT will be at a logic high, and therefore TOGGLE2 and TOGGLE1 as output by the AND gates 21 and 25 will reflect the logic states of nodes A and AB. Therefore, if voltage A is high and voltage AB is low, TOGGLE2 will transition high while TOGGLE1 will remain low; similarly, if voltage A is low and voltage AB is high, TOGGLE1 will transition high while TOGGLE2 will remain low. When TOGGLE2 rises high, the ripple counter 22 (and therefore BIND increments; when TOGGLE1 rises high, the ripple counter 26 (and therefore BIN0) increments.

BIN0 and BIN1 are read by the processing circuitry 7 at the end of each exposure of the SPADs D1-D3 so as to provide time for the output of the ripple counters 22 and 26 to stabilize prior to readout. The values read from BIN0 and BIN1 are used by the processing circuitry 7 as samples of the reflected laser light detected by the receiver 12 during different phases of the period of the reflected laser light. For example, BIN0 may be considered to be a sample of the amplitude of the reflected laser light between 0 and 180 degrees of phase, and BIN1 may be considered to be a sample of the amplitude of the reflected laser light between 180 and 360 degrees of phase. From these values of BIN0 and BIN1, and the known frequency of the continuously modulated sinusoidal laser light emitted from the laser diodes 2, the distance to the target 4 can be calculated. A sample calculation will be given below with respect to a four bin implementation that will be described below.

Figure 5:
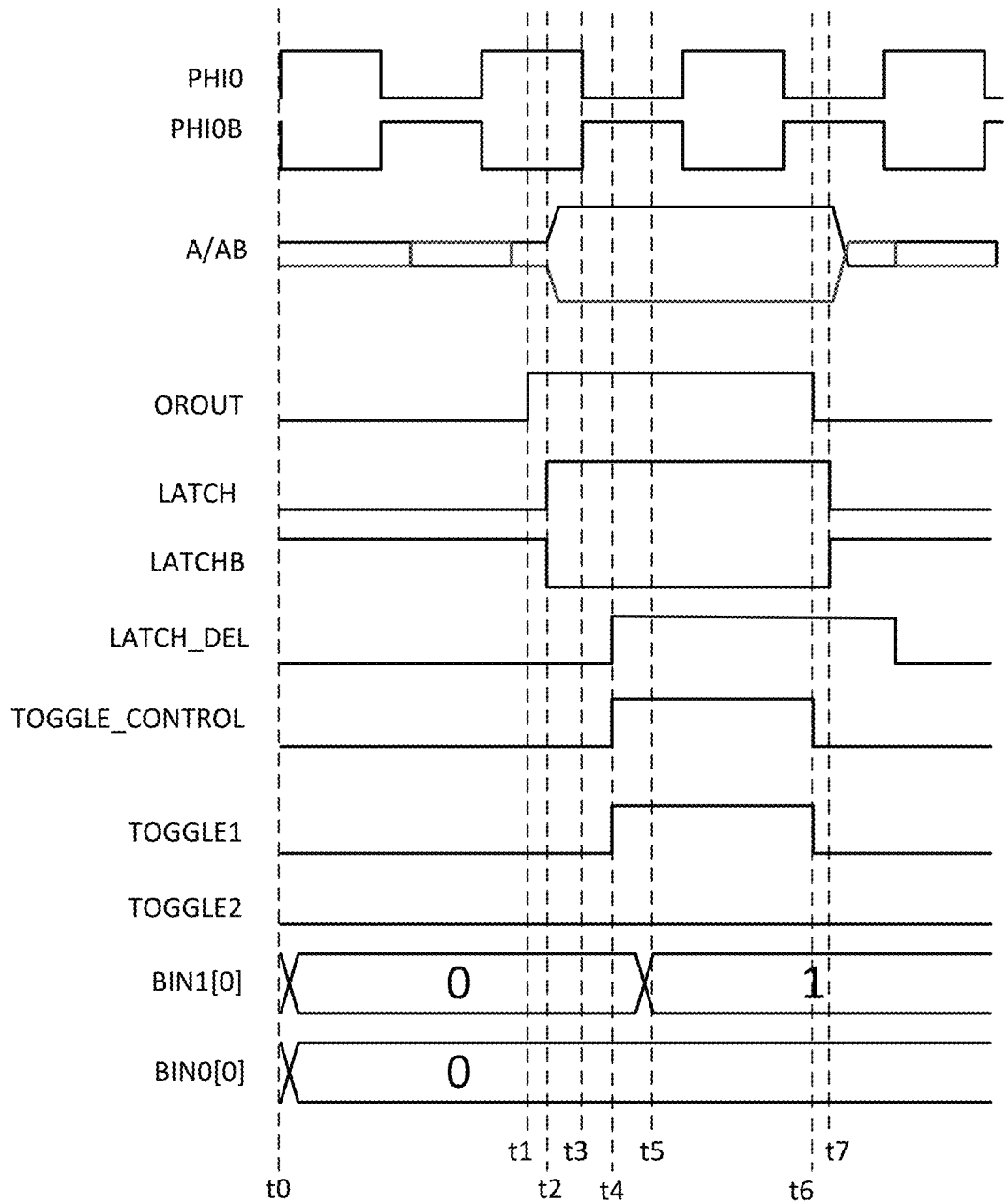
FIG. 5 is a timing diagram of the iTOF system of FIG. 1 utilizing the latch and counter block of FIG. 4 in operation.

An example operation of the iTOF ranging system 1 will now be described with additional reference to the timing diagram of FIG. 5. Between times t0 and t1, an incoming photon has not struck any of the SPADs D1-D3 of the receiver circuit 12, and therefore OROUT remains low. This means that LATCH remains at a logic low with the result being that MN2 and MN4 remain off, LATCHB remains at a logic high with the result being that MP1 and MP3 remain off, and the transmission gates TG1 and TG2 are on with the result being that the dynamic latch 51 is deactivated so that voltage A follows PHI0 and node B follows PHI0B. In addition, since OROUT is low, TOGGLE_CONTROL as output by AND gate 14 remains low, and therefore TOGGLE2 and TOGGLE1 as output by AND gates 21 and 25 remain low such that the ripple counters 22 and 26 do not increment their counts.

At time t1, a detection event has occurred. In particular, an incoming photon has struck one of the SPADs D1-D3, and therefore OROUT transitions to a logic high. As a result, at time t2, LATCH as output by buffer B5 transitions to a logic high while LATCHB as output by buffer B6 transitions to a logic low. This turns off the transmission gates TG1 and TG2, and turns on transistors MP1, MP3, MN2, and MN4 to therefore activate the dynamic latch 51. When the transmission gates TG1 and TG2 turn off, the states of PHI0 and PHI0B are respectively captured and latched by the cross coupled inverters 9a and 9b of the dynamic latch 51 by time t3. Therefore, notice that at time t3, since PHI0 is at a logic high, voltage A is forced to a logic high; similarly, notice that time t3, since PHI0B is at a logic low, voltage AB is forced to a logic low. By time t4, OROUT has propagated from the output of the OR gate 13, through buffer B5, and through the buffer B4 to transition LATCH_DEL high. Since at this point LATCH_DEL is at a logic high in addition to OROUT being at a logic high, TOGGLE_CONTROL at the output of the AND gate 14 rises to a logic high. Now, since TOGGLE_CONTROL is at a logic high and voltage A is at a logic high, TOGGLE2 as output by the AND Gate 21 rises to a logic high; similarly, since voltage AB is at a logic low, TOGGLE1 as output by the AND gate 25 remains at a logic low. Assuming the ripple counter 22 was storing a value of "0" at time t4, TOGGLE2 rising to a logic high at time t4 causes the output of the ripple counter 22 to increment by one by time t5, and therefore BIN0[0] is a "1" at time t5; similarly, assuming the ripple counter 26 was storing a value of "0" at time t4, TOGGLE1 remaining at a logic low at time t4 means that the output of the ripple counter 26 remains unchanged through time t5, and therefore BIN1[0] is a "0" at time t5.

At time t6, the avalanche of the SPAD D1-D3 struck by the photon ends, and therefore the OROUT signal as output by the OR gate 13 transitions low. By time t7, OROUT and its complement OROUTB have propagated through the buffers B5 and B6, and therefore the LATCH signal transitions low while the LATCHB signal transitions high. This turns the transmission gates TG1 and TG2 back on while turning off the transistors MP1, MP3, MN2, MN4 to once again deactivate the dynamic latch 51. The dynamic latch 51 being deactivated means that the voltages A and AB return to following PHI0 and PHI0B. In addition, by time t7, the LATCH signal has propagated through the buffer B4, so TOGGLE_CONTROL as output by the AND gate 14 has transitioned to a logic low, with the result being that TOGGLE2 as output by the AND gate 21 transitions low and TOGGLE1 as output by the AND gate 25 remains low. As a consequence, the ripple counters 22 and 26 do not increment.

As explained above, BIN0 and BIN1 represent the amplitude of the reflected laser at different phases of a period of the reflected laser, are read by the processing circuitry 7 at the end of each exposure, and are used by the processing circuitry 7 in calculating the distance to the target 4.

Figure 4A:
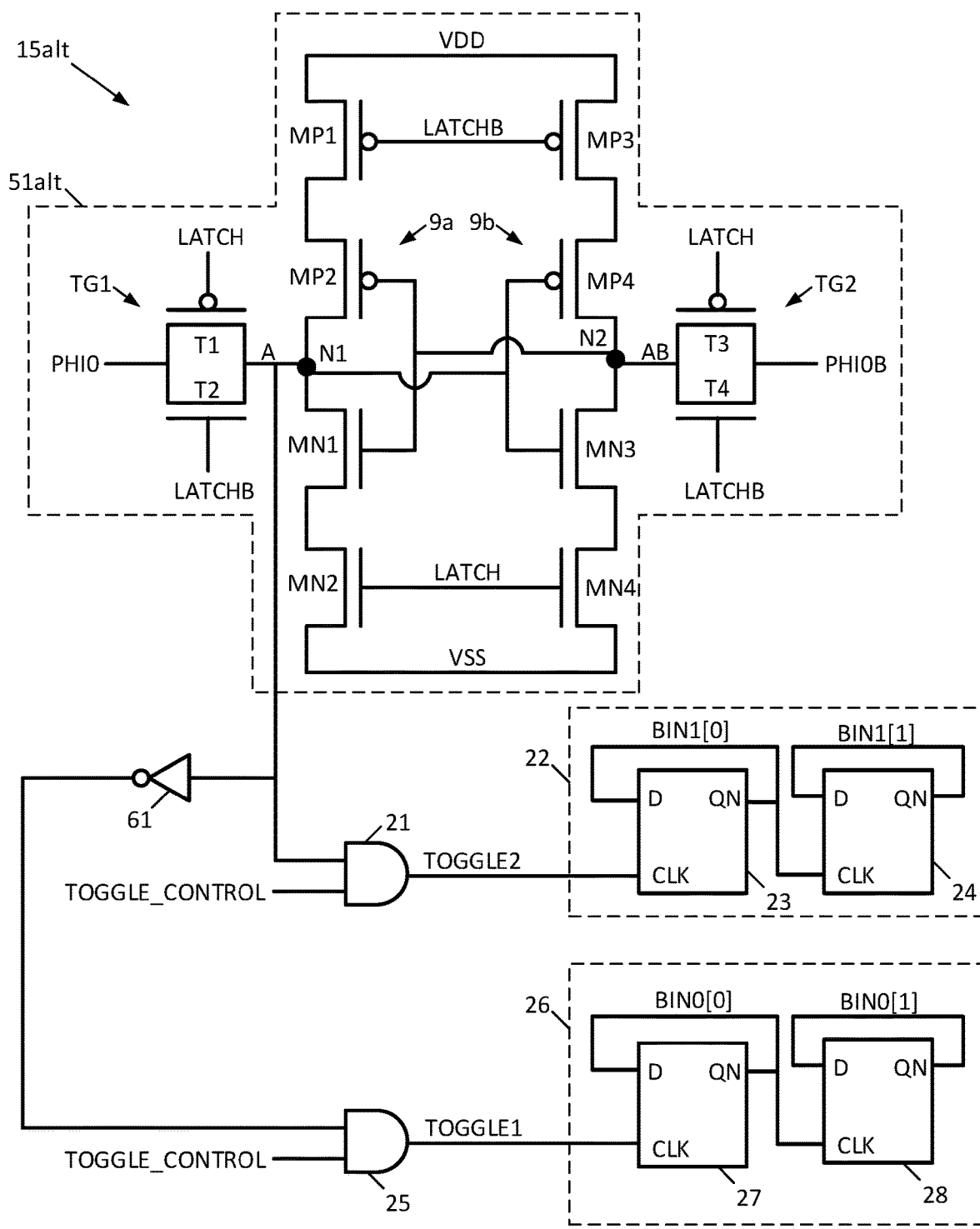
FIG. 4A is a schematic diagram of a variant of the latch and counter block of FIG. 4 in which the dynamic latch has one output instead of two outputs.

In the examples described above, the TOGGLE1 signal produced by the AND gate 25 is the result of a logical AND operation performed on the TOGGLE_CONROL signal and voltage AB. However, as shown in the alterative latch and counter block 15alt of FIG. 4A, the TOGGLE1 signal produced by the AND gate 25 may instead be produced by inverting the voltage A using an inverter 61, and then using the AND gate 25 to perform a logical AND operation on the TOGGLE_CONTROL signal and the inverted version of the voltage A.

Figure 6:
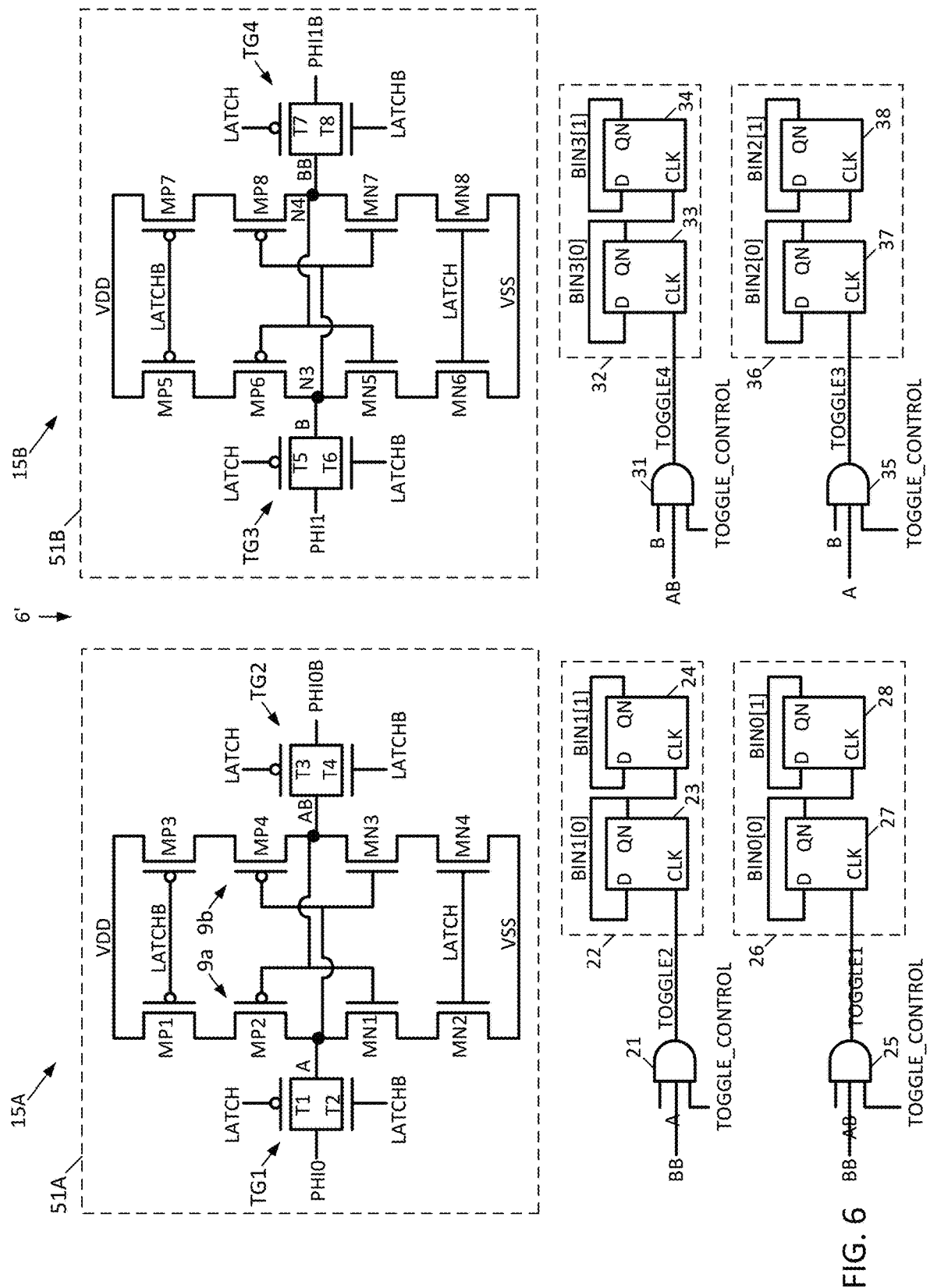
FIG. 6 is a schematic diagram of an alternate front end such as may be used with the iTOF ranging system of FIG. 1 in which where are multiple latch and counter blocks.

In the examples described above, there is one latch and counter block 15 per front end 6, with one front end 6 per zone 11. However, in some applications, there may be multiple latch and counter blocks 15 per front end 6, still with one front end 6 per zone 11. Shown in FIG. 6 is an example where the front end 6' includes two latch and counter blocks 15A and 15B.

The latch and counter block 15A includes dynamic latch 51A, AND gate 21, ripple counter 22, AND gate 25, and ripple counter 26. The LATCH and LATCHB signals operate to enable or disable the dynamic latch 51A, the differential timing references PHI0 and PHI0B are the data inputs to the dynamic latch 51A, and the voltages A and AB are the data outputs of the dynamic latch 51A.

The latch and counter block 15B includes dynamic latch 51B, AND gate 31, ripple counter 32, AND gate 35, and ripple counter 36. The LATCH and LATCHB signals operate to enable or disable the dynamic latch 51B, the differential timing references PHI1 and PHI1B are the data inputs to the dynamic latch 51B, and the voltages B and BB are the data outputs of the dynamic latch 51B.

Note that the differential timing references PHI0 and PHI0B are LVDS clock signals, and that the differential timing references PHI1 and PHI1B are also LVDS clock signals.

In the absence of a detection event, the voltages A and AB follow the differential timing references PHI0 and PHI0B, and the voltages B and BB follow the differential timing references PHI1 and PHI1B, while the ripple counters 22, 26, 32, and 36 do not increment.

When a detection event occurs, the voltages A and AB are latched to the current state of the differential timing references PHI0 and PHI0B and are raised from a LVDS voltage swing to a full voltage swing. When the detection event occurs, the voltages B and BB are latched to the current state of the differential timing references PHI1 and PHI1B and are raised from a LVDS voltage swing to a full voltage swing.

If voltage AB and BB rise a logic high, TOGGLE1 is output by the AND gate 25 as a logic high, and the ripple counter 26 (and therefore BIN0) increments. If the voltages A and BB rise to a logic high, TOGGLE2 is output by the AND gate 21 as a logic high, and the ripple counter 22 (and therefore BIN1) increments.

If the voltages A and B rise to a logic high, TOGGLE3 is output by the AND gate 35 as a logic high, and the ripple counter 36 (and therefore BIN2) increments. If the voltages B and AB rise to a logic high, TOGGLE4 is output by the AND gate 31 as a logic high, and the ripple counter 32 (and therefore BIN3) increments.

Figure 7:
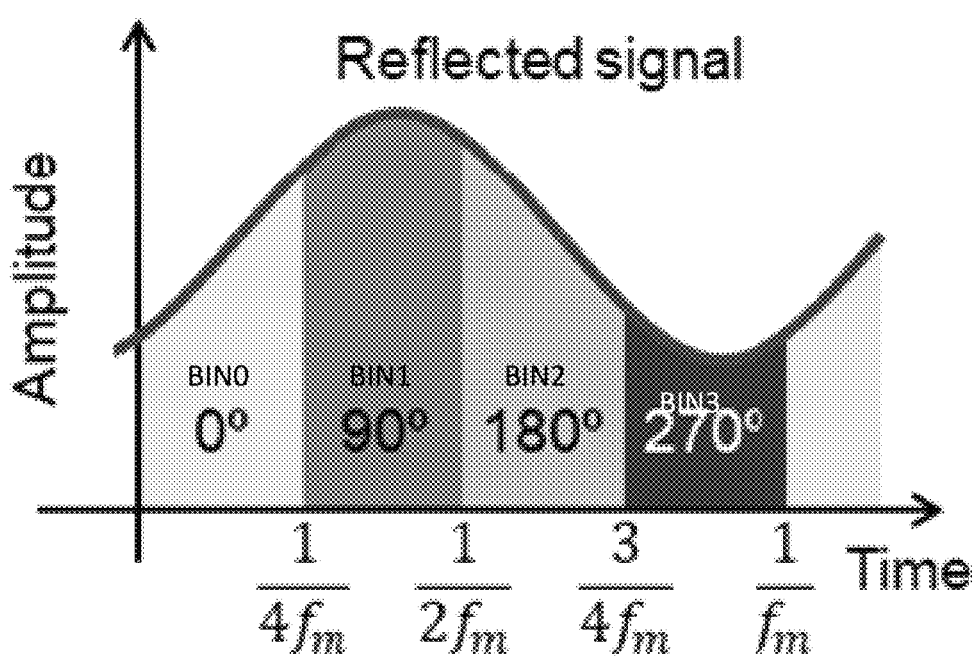
FIG. 7 is a graph showing the amplitude of the reflected laser over time, separated into phases sampled by the ripple counters of FIG. 6.

BIN0, BIN1, BIN2, and BIN3 are read by the processing circuitry 7 at the end of each exposure and used by the processing circuitry 7 in calculating the distance to the target 4. Show in FIG. 7 is how BIN0 can be considered to represent a sample of the amplitude of the reflected laser between 0 and 90 degrees of phase, how BIN1 can be considered to represent a sample of the amplitude of the reflected laser between 90 and 180 degrees of phase, how BIN2 can be considered to represent a sample of the amplitude of the reflected laser between 180 and 270 degrees of phase, and how BIN3 can be considered to represent a sample of the amplitude of the reflected laser between 270 and 360 degrees of phase. From these samples, the distance to the target 4 can be calculated as:

$$d = \frac{c}{2f} * \frac{\varphi}{2\pi}, \text{ where } \varphi = a\tan2\left[\frac{(A1-A3)-(A0-A2)}{(A1-A3)+(A0-A2)}\right]$$

and with c being the speed of light, f being the frequency of the continuously modulated sinusoidal laser light emitted by the laser diodes 2, A0 being BIN0, A1 being BIN1, A2 being BIN2, and A3 being BIN3.

Figure 8:
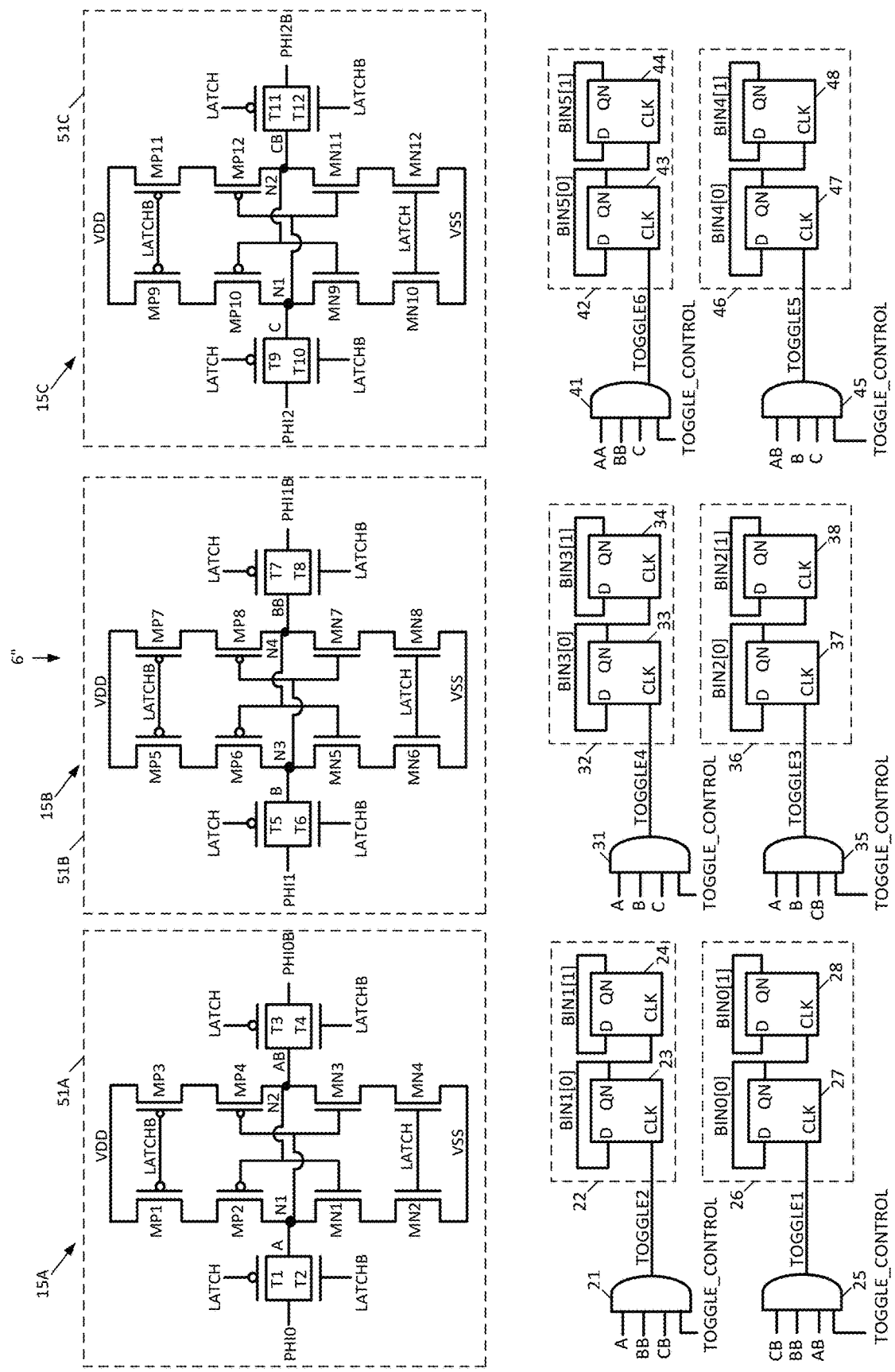
FIG. 8 is a schematic diagram of an alternate front end such as may be used with the iTOF ranging system of FIG. 1 in which where are multiple latch and counter blocks.

Shown in FIG. 8 is an example where the front end 6″ includes three latch and counter blocks 15A, 15B, and 15C.

The latch and counter block 15A includes dynamic latch 51A, AND gate 21, ripple counter 22, AND gate 25, and ripple counter 26. The LATCH and LATCHB signals operate to enable or disable the dynamic latch 51A, the differential timing references PHI0 and PHI0B are the data inputs to the dynamic latch 51A, and the voltages A and AB are the data outputs of the dynamic latch 51A.

The latch and counter block 15B includes dynamic latch 51B, AND gate 31, ripple counter 32, AND gate 35, and ripple counter 36. The LATCH and LATCHB signals operate to enable or disable the dynamic latch 51B, the differential timing references PHI1 and PHI1B are the data inputs to the dynamic latch 51B, and the voltages B and BB are the data outputs of the dynamic latch 51B.

The latch and counter block 15C includes dynamic latch 51C, AND gate 41, ripple counter 42, AND gate 45, and ripple counter 46. The LATCH and LATCHB signals operate to enable or disable the dynamic latch 51C, the differential timing references PHI2 and PHI2B are the data inputs to the dynamic latch 51C, and the voltages C and CB are the data outputs of the dynamic latch 51C.

Note that the differential timing references PHI0 and PHI0B are LVDS clock signals, that the differential timing references PHI1 and PHI1B are LVDS clock signals, and that the differential timing references PHI2 and PHI2B are LVDS clock signals.

In the absence of a detection event, the voltages A and AB follow the differential timing references PHI0 and PHI0B, the voltages B and BB follow the differential timing references PHI1 and PHI1B, and the voltages C and CB follow the differential timing references PHI2 and PHI2B, while the ripple counters 22, 26, 32, 36, 42, and 46 do not increment.

When a detection event occurs, the voltages A and AB are latched to the current state of the differential timing references PHI0 and PHI0B and are raised from a LVDS voltage swing to a full voltage swing. In addition, when the detection event occurs, the voltages B and BB are latched to the current state of the differential timing references PHI1 and PHI1B and are raised from a LVDS voltage swing to a full voltage swing.

Furthermore, when the detection event occurs, the voltages C and CB are latched to the current state of the differential timing references PHI2 and PHI2B and are raised from a LVDS voltage swing to a full voltage swing.

If voltages AB, BB, and CC rise a logic high, TOGGLE1 is output by the AND gate 25 as a logic high, and the ripple counter 26 (and therefore BIN0) increments. If the voltages A, BB, and CB rise to a logic high, TOGGLE2 is output by the AND gate 21 as a logic high, and the ripple counter 22 (and therefore BIN1) increments.

If the voltages A, B, and CB rise to a logic high, TOGGLE3 is output by the AND gate 35 as a logic high, and the ripple counter 36 (and therefore BIN2) increments. If the voltages A, B, and C rise to a logic high, TOGGLE4 is output by the AND gate 31 as a logic high, and the ripple counter 32 (and therefore BIN3) increments.

If the voltages AB, B, and C rise to a logic high, TOGGLE5 is output by the AND gate 45 as a logic high, and the ripple counter 46 (and therefore BIN4) increments. If the voltages AA, BB, and C rise to a logic high, TOGGLE6 is output by the AND gate 41 as a logic high, and the ripple counter 42 (and therefore BIN5) increments.

Figure 9:
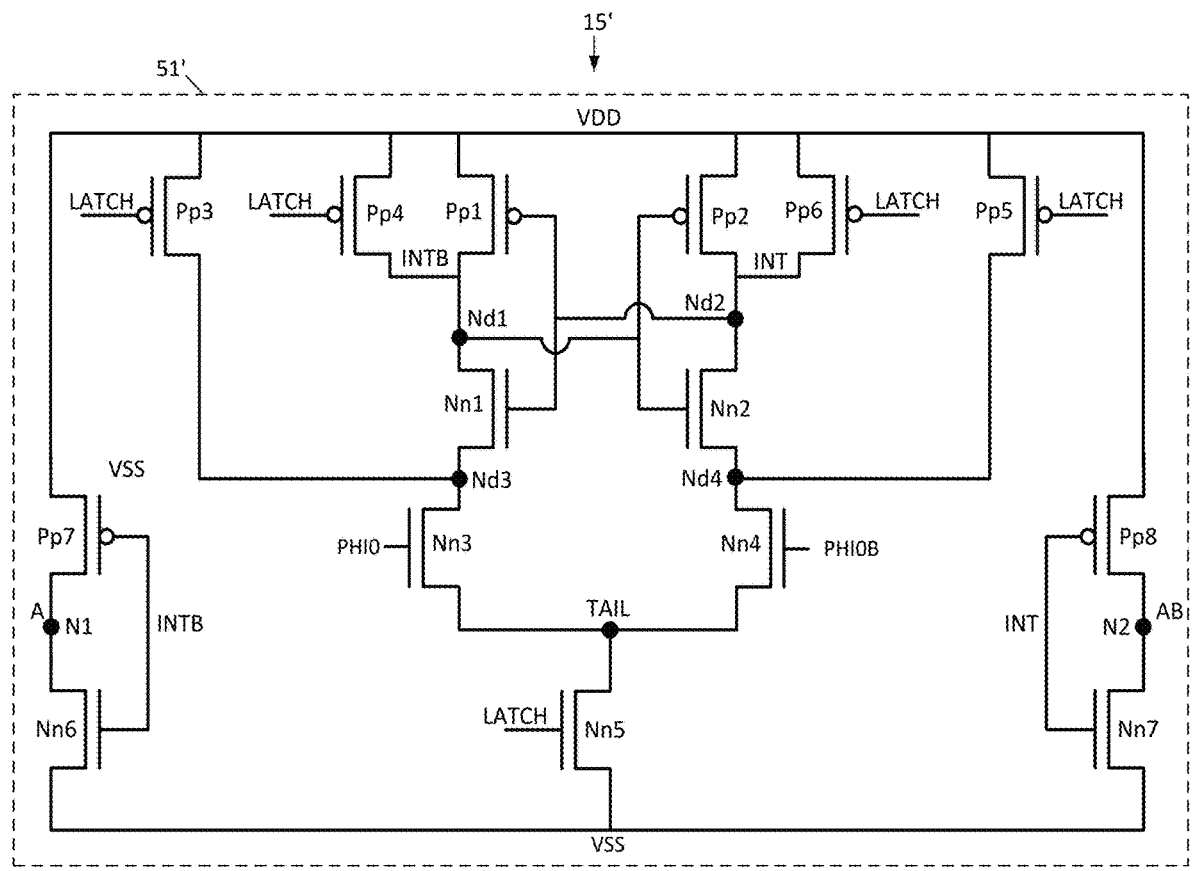
FIG. 9 is a schematic diagram of an alternate front end such as may be used with the iTOF ranging system of FIG. 1 in which the dynamic latch used within the latch and counter block is different than that of FIG. 4.
Figure 9:
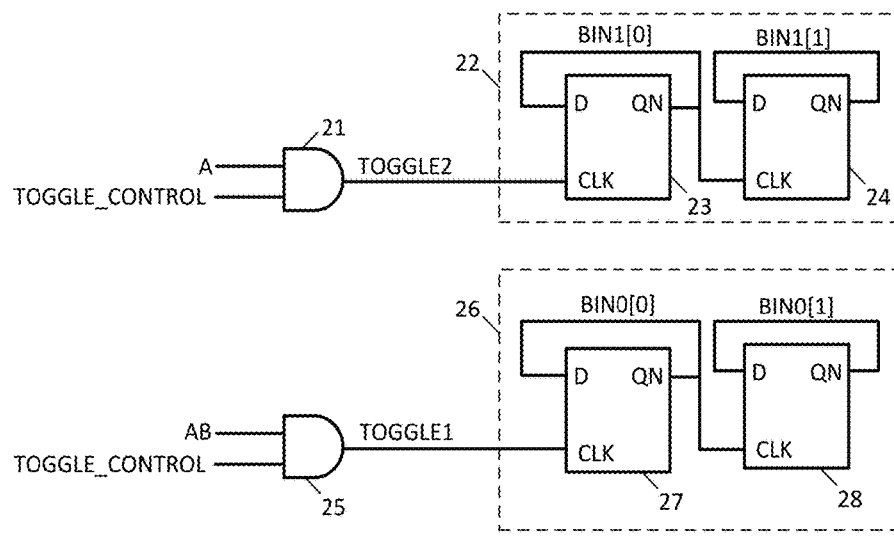

BIN0, BIN1, BIN2, BIN3, BIN4, and BIN5 are read by the processing circuitry 7 at the end of each exposure and used by the processing circuitry 7 in calculating the distance to the target 4. BIN0 can be considered to represent a sample of the amplitude of the reflected laser between 0 and 60 degrees of phase, BIN1 can be considered to represent a sample of the amplitude of the reflected laser between 60 and 120 degrees of phase, BIN2 can be considered to represent a sample of the amplitude of the reflected laser between 120 and 180 degrees of phase, BIN3 can be considered to represent a sample of the amplitude of the reflected laser between 180 and 240 degrees of phase, BIN4 can be considered to represent a sample of the amplitude of the reflected laser between 240 and 300 degrees of phase, and BIN5 can be considered to represent a sample of the amplitude of the reflected laser between 300 and 360 degrees of phase. Now described with reference to FIG. 9 is an example of the latch and counter block 15′ in which the latch 51′ has an alternative design. The latch 51′ includes p-channel transistor Pp1 having its source coupled to VDD, its drain coupled to node Nd1, and its gate coupled to the gate of n-channel transistor Nn1. The latch 51′ also includes n-channel transistor Nn1 having its drain coupled to node Nd1, its source coupled to node Nd3, and its gate coupled to the gate of Pp1. P-channel transistor Pp2 has its source coupled to VDD, its drain coupled to node Nd2, and its gate coupled to the gate of n-channel transistor Nn2. N-channel transistor Nn2 has its drain coupled to node Nd2, its source coupled to node Nd4, and its gate coupled to the gate of Pp2.

N-channel transistor Nn3 has its drain coupled to node Nd3, its source coupled to the tail node TAIL, and its gate coupled to the PHI0 differential timing reference. N-channel transistor Nn4 has its drain coupled to node Nd4, its source coupled to the tail node TAIL, and its gate coupled to the PHI0B signal.

P-channel transistor Pp3 has its source coupled to VDD, its drain coupled to node Nd3, and its gate coupled to the LATCH signal. P-channel transistor Pp4 has its source coupled to VDD, its drain coupled to node Nd1, and its gate coupled to the LATCH signal. P-channel transistor Pp5 has its source coupled to VDD, its drain coupled to node Nd4, and its gate coupled to the LATCH signal. P-channel transistor Pp6 has its source coupled to VDD, its drain coupled to Nd2, and its gate coupled to the LATCH signal.

P-channel transistor Pp7 has its source coupled to VDD, its drain coupled to node N1 at which the voltage A is produced, and its gate coupled to the gate of n-channel transistor Nn6. N-channel transistor Nn6 has its drain coupled to node N1, its source coupled to VSS, and its gate coupled to the gate of Pp7. P-channel transistor Pp7 and n-channel transistor Nn6 form a second inverter.

P-channel transistor Ppb has its source coupled to VDD, its drain coupled to node N2 at which the voltage AB is produced, and its gate coupled to the gate of n-channel transistor Nn7. N-channel transistor Nn7 has its drain coupled to node N2, its source coupled to VSS, and its gate coupled to the gate of Pp8. P-channel transistor Pp8 and n-channel transistor Nn7 form a first inverter.

A first AND gate 25 has inputs coupled to node N2 and TOGGLE_CONROL, and generates the complement of the toggle signal as TOGGLEB. A ripple counter 26 receives TOGGLEB. The ripple counter 26 is comprised of flip flops 27 and 28, with flip flop 27 receiving TOGGLEB at its clock input CLK and having its D input coupled to its QN output as well as to the clock input CLK of the flip flop 28. The flip flop 28, in addition to having its clock input CLK coupled to the QN output of the flip flop 27, has its D input coupled to its QN output. Note that the state of the QN output of the flip flop 27 stores the BIN0[0] bit, while the state of the QN output of the flip flop 28 stores the BIN0[1] bit.

A second AND gate 21 has inputs coupled to node N1 and TOGGLE_CONROL, and generates the toggle signal TOGGLE. A ripple counter 22 receives TOGGLE. The ripple counter 22 is comprised of flip flops 23 and 24, with flip flop 23 receiving TOGGLE at its clock input CLK and having its D input coupled to its QN output as well as to the clock input CLK of the flip flop 24. The flip flop 24, in addition to having its clock input CLK coupled to the QN output of the flip flop 23, has its D input coupled to its QN output. Note that the state of the QN output of the flip flop 23 stores the BIN1[0] bit, while the state of the QN output of the flip flop 24 stores the BIN1[1] bit.

In operation, as described, in the absence of a detection event, OROUT remains at a logic low, meaning that the LATCH signal remains at a logic low. This has the effect of turning off Nn5, decoupling the tail node TAIL from Vss.

This turns on transistors Pp3, Pp4, Pp5, and Pp6. Since Pp4 and Pp6 are turned on, nodes Nd1 and Nd2 are pulled to a logic high. Node Nd1 being a logic high turns off Pp2, while node Nd2 being a logic high turns off Pp1. Pp3 being on pulls node Nd3 high, and since node Nd2 is at a logic high, this means that there is insufficient gate to source voltage to turn on Nn1, and therefore Nn1 is turned off. Pp5 being on pulls node Nd4 high, and since node Nd1 is at a logic high, this means that there is insufficient gate to source voltage to turn on Nn2, and therefore Nn2 is turned off.

Notes Nd1 and Nd2 being at a logic high mean that intermediate signals INTB and INT (respectively produced at nodes Nd1 and Nd2) are at a logic high. This has the effect of turning off Pp7 but turning on Nn6 to thereby pull voltage A to a logic low, and turning off Ppb but turning on Nn7 to thereby pull voltage AB to a logic low. The result of this is that TOGGLE1 as output by the AND gate 25 and TOGGLE2 as output by the AND gate 21 would both remain at a logic low, and the ripple counters 26 and 22 would not increment.

When a detection event occurs, OROUT rises to a logic high, meaning that the LATCH signal rises to a logic high. This turns on Nn5, coupling the tail node TAIL to VSS. LATCH rising to a logic high also serves to turn off transistors Pp3, Pp4, Pp5, and Pp6.

Since nodes Nd1 and Nd2 were at a logic high prior to the detection event, this means that at the time of the detection event, Nn1 and Nn2 will be on. Therefore, assuming that PHI0 is at a logic high and PHI0B is at a logic low, Nn3 will be turned on while Nn4 will be turned off. As such, node Nd1 (and therefore voltage INTB) will be pulled to a logic low, which will turn on Pp7 while turning off Nn6 to thereby pull node N1 (and therefore voltage A) to a logic high. Since the timing reference PHI0B is at a logic low here, node Nd2 (and therefore voltage INT) will remain at a logic high, which will turn on Nn7 while turning off Pp8 to thereby pull node N2 (and therefore node AB) to a logic low.

Voltage A being at a logic high will have the effect of causing the voltage TOGGLE2 as output by the AND gate 21 to rise to a logic high, incrementing the ripple counter 22. Voltage AB being at a logic low will have the effect of causing the voltage TOGGLE1 as output by the AND gate 25 to fall to a logic low, and the ripple counter 26 will not increment.

If PHI0 had instead been at a logic low while PHI0B was at a logic high, Nn4 will be turned on while Nn3 will be turned off. As such, node Nd2 (and therefore voltage INT) will be pulled to a logic low, which will turn on Pp8 while turning off Nn7 to thereby pull node N2 (and therefore voltage AB) to a logic high. Since the timing reference PHI is at a logic low here, node Nd1 (and therefore voltage INTB) will remain at a logic high, which will turn on Nn7 while turning off Pp7 to thereby pull node N1 (and therefore node A) to a logic low.

Voltage AB being at a logic high will have the effect of causing the voltage TOGGLE1 as output by the AND gate 25 to rise to a logic high, incrementing the ripple counter 26. Voltage A being at a logic low will have the effect of causing the voltage TOGGLE2 as output by the AND gate 22 to fall to a logic low, and the ripple counter 22 will not increment.

BIN0 and BIN1 are read by the processing circuitry 7 at the end of each exposure and used by the processing circuitry 7 in calculating the distance to the target 4.

Note that the latch 51' is also functional with the removal of transistors Pp3 and Pp5, which serve to reduce the effect of mismatch by the strong pre-charge created at nodes Nd3 and Nd4.

Figure 9A:
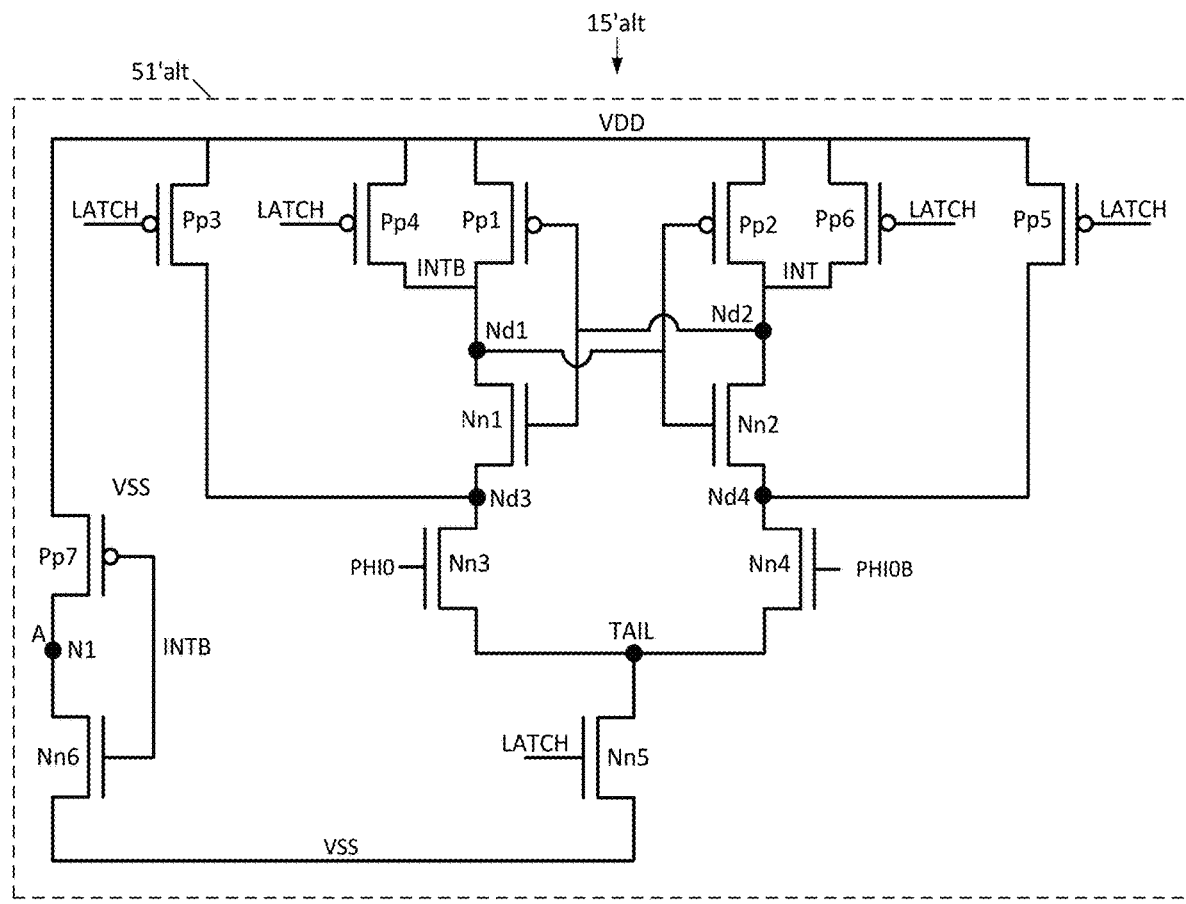
FIG. 9A is a schematic diagram of the front end of FIG. 0 in which the dynamic latch has one output instead of two outputs.
Figure 9A:
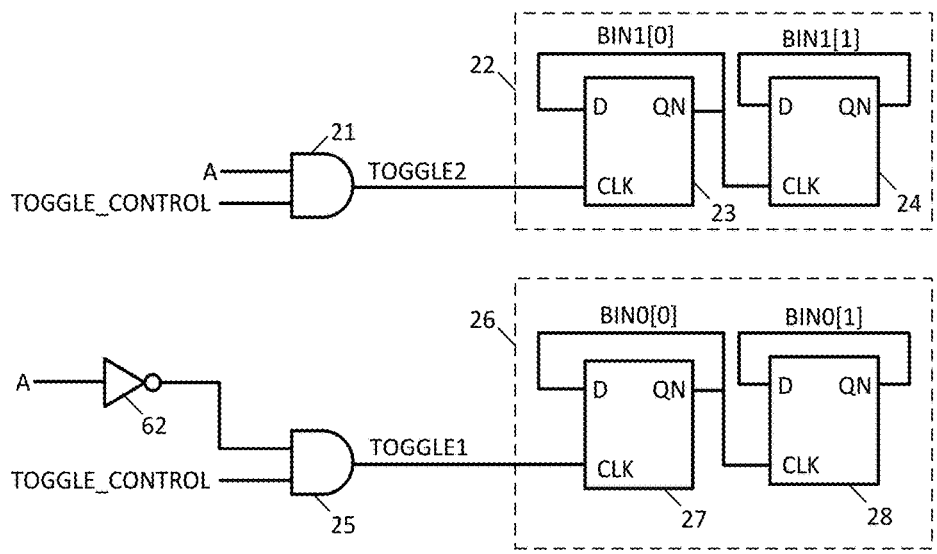

In the examples described above, the TOGGLE1 signal produced by the AND gate 25 is the result of a logical AND operation performed on the TOGGLE_CONROL signal and voltage AB. However, as shown in the alterative latch and counter block 15'alt of FIG. 9A, the TOGGLE1 signal produced by the AND gate 25 may instead be produced by inverting the voltage A using an inverter 62, and then using the AND gate 25 to perform a logical AND operation on the TOGGLE_CONTROL signal and the inverted version of the voltage A. Note that in this example, transistors Ppb and Nn7 from FIG. 9 are not present.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A time of flight ranging system, comprising:
   a receiver configured to assert a photon received signal in response to detection of light that has reflected off a target and returned to the time of flight ranging system; and
   a first latch circuit having first and second data inputs receiving a first pair of differential timing references, the first latch circuit being configured to latch data values at its first and second data inputs based upon assertion of the photon received signal.

2. The time of flight ranging system of claim 1, wherein the first latch circuit latches data values at its first data input to a first data output; and further comprising:
   a first counter configured to count latching events of the first latch circuit during which the first data output is asserted; and
   a second counter configured to count latching events of the first latch circuit during which an inversion of a voltage at the first data output is asserted.

3. The time of flight ranging system of claim 1, wherein the first latch circuit latches data values at its first and second data inputs to first and second data outputs; and further comprising:
   a first counter configured to count latching events of the first latch circuit during which the first data output is asserted; and
   a second counter configured to count latching events of the first latch circuit during which the second data output is asserted.

4. The time of flight ranging system of claim 1,
   further comprising a control signal generation block configured to generate a latch command signal by applying a delay to the photon received signal;
   wherein the first latch circuit has an enable input receiving the latch command signal; and
   wherein the first latch circuit is configured to latch in response to assertion of the latch command signal.

5. The time of flight ranging system of claim 4, wherein the first latch circuit latches data values at its first data input to a first data output;
   wherein the control signal generation block is further configured to:
      generate a delayed latch command signal by applying a delay to the latch command signal; and
      generate a toggle control signal by performing a logical operation on the delayed latch command signal and the photon received signal;
   further comprising a first AND gate performing a logical AND on the first data output and the toggle control signal to produce a toggle signal;
   further comprising a first ripple counter having a clock input receiving the toggle signal;
   further comprising a second AND gate performing a logical AND operation on an inverted version of the first data output and the toggle control signal to produce a complement of the toggle signal; and
   further comprising a second ripple counter having a clock input receiving the complement of the toggle signal.

6. The time of flight ranging system of claim 5, wherein the logical operation performed by the control signal generation block on the delayed latch command signal and the photon received signal to generate the toggle control signal is a logical AND operation.

7. The time of flight ranging system of claim 5,
   wherein the control signal generation block is further configured to generate a complement of the latch command signal by applying a delay to a complement of the photon received signal; and
   wherein the first latch circuit comprises:
      a first transmission gate having an input coupled to the first data input and an output coupled to the first data output, the first transmission gate configured to open in response to deassertion of the latch command signal and assertion of the complement of the latch command signal; and
      a second transmission gate having an input coupled to the second data input, the second transmission gate configured to open in response to deassertion of the latch command signal and assertion of the latch command signal.

8. The time of flight ranging system of claim 7,
   wherein the first latch circuit further comprises:
      first and second CMOS inverters in a cross coupled arrangement, with an input of the first CMOS inverter coupled to an output of the second CMOS inverter and with an input of the second CMOS inverter coupled to an output of the first CMOS inverter;
      a first enable circuit configured to control coupling of a supply voltage to supply terminals of the first and second CMOS inverters in response to deassertion of the complement of the latch command signal; and
      a second enable circuit configured to control coupling of a ground voltage to ground terminals of the first and second CMOS inverters in response to assertion of the latch command signal;
   wherein the output of the first CMOS inverter is the first data output of the first latch circuit.

9. The time of flight ranging system of claim 4,
   wherein the first latch circuit latches data values at its first and second data inputs to first and second data outputs;
   wherein the control signal generation block is further configured to:
      generate a delayed latch command signal by applying a delay to the latch command signal; and
      generate a toggle control signal by performing a logical operation on the delayed latch command signal and the photon received signal;
   further comprising a first AND gate performing a logical AND on the first data output and the toggle control signal to produce a toggle signal;
   further comprising a first ripple counter having a clock input receiving the toggle signal;
   further comprising a second AND gate performing a logical AND operation on the second data output and the toggle control signal to produce a complement of the toggle signal; and
   further comprising a second ripple counter having a clock input receiving the complement of the toggle signal.

10. The time of flight ranging system of claim 9, wherein the logical operation performed by the control signal generation block on the delayed latch command signal and the photon received signal to generate the toggle control signal is a logical AND operation.

11. The time of flight ranging system of claim 9,
wherein the control signal generation block is further configured to generate a complement of the latch command signal by applying a delay to a complement of the photon received signal; and
wherein the first latch circuit comprises:
  a first transmission gate having an input coupled to the first data input and an output coupled to the first data output, the first transmission gate configured to open in response to deassertion of the latch command signal and assertion of the complement of the latch command signal; and
  a second transmission gate having an input coupled to the second data input and an output coupled to the second data output, the second transmission gate configured to open in response to deassertion of the latch command signal and assertion of the latch command signal.

12. The time of flight ranging system of claim 11,
wherein the first latch circuit further comprises:
  first and second CMOS inverters in a cross coupled arrangement, with an input of the first CMOS inverter coupled to an output of the second CMOS inverter and with an input of the second CMOS inverter coupled to an output of the first CMOS inverter;
  a first enable circuit configured to control coupling of a supply voltage to supply terminals of the first and second CMOS inverters in response to deassertion of the complement of the latch command signal; and
  a second enable circuit configured to control coupling of a ground voltage to ground terminals of the first and second CMOS inverters in response to assertion of the latch command signal;
wherein the output of the first CMOS inverter is the first data output of the first latch circuit; and
wherein the output of the second CMOS inverter is the second data output of the first latch circuit.

13. The time of flight ranging system of claim 1, wherein the receiver comprises a plurality of single photon avalanche diodes (SPADs) coupled to an OR-tree, the OR-tree configured to assert the photon received signal in response to at least one of the SPADs being struck by the light that has reflected of the target and returned to the time of flight ranging system.

14. The time of flight ranging system of claim 1, further comprising a light emitter configured to emit light at a target.

15. The time of flight ranging system of claim 12, further comprising:
  a second latch circuit having a first and second data inputs receiving a second pair of differential timing references, the second latch circuit having first and second data outputs, the second latch circuit being configured to latch data values at its first and second data inputs to its first and second data outputs based upon assertion of the photon received signal;
  a third counter configured to count latching events of the second latch circuit during which the first data output of the second latch circuit is asserted; and
  a fourth counter configured to count latching events of the second latch circuit during which the second data output of the second latch circuit is asserted.

16. The time of flight ranging system of claim 15,
wherein the second latch circuit has an enable input receiving the latch command signal; and
wherein the second latch circuit is configured to latch in response to assertion of the latch command signal.

17. The time of flight ranging system of claim 16,
further comprising a third AND gate performing a logical AND operation on the first data output of the second latch circuit and the toggle control signal to produce a second toggle signal;
wherein the third counter comprises a third ripple counter having a clock input receiving the second toggle signal;
further comprising a fourth AND gate performing a logical AND operation on the second data output of the second latch circuit and the toggle control signal to produce a complement of the second toggle signal; and
wherein the fourth counter comprises a fourth ripple counter having a clock input receiving the complement of the second toggle signal.

18. The time of flight ranging system of claim 17,
wherein the second latch circuit comprises:
  a third transmission gate having an input coupled to the first data input of the second latch circuit and an output coupled to the first data output of the second latch circuit, the third transmission gate configured to open in response to deassertion of the latch command signal and assertion of the complement of the latch command signal; and
  a fourth transmission gate having an input coupled to the second data input of the second latch circuit and an output coupled to the second data output of the second latch circuit, the fourth transmission gate configured to open in response to deassertion of the latch command signal and assertion of the latch command signal.

19. The time of flight ranging system of claim 18,
wherein the second latch circuit further comprises:
  third and fourth CMOS inverters in a cross coupled arrangement with an input of the third CMOS inverter coupled to an output of the fourth CMOS inverter and with an input of the fourth CMOS inverter coupled to an output of the third CMOS inverter;
  a third enable circuit configured to control coupling of a supply voltage to supply terminals of the third and fourth CMOS inverters in response to deassertion of the complement of the latch command signal; and
  a fourth enable configured to control coupling of a ground voltage to ground terminals of the third and fourth CMOS inverters in response to assertion of the latch command signal;
wherein the output of the third CMOS inverter is the first data output of the second latch circuit; and
wherein the output of the fourth CMOS inverter is the second data output of the second latch circuit.

20. The time of flight ranging system of claim 19, further comprising:
  a third latch circuit having first and second data inputs receiving a third pair of differential timing references, the third latch circuit having first and second data outputs, the third latch circuit being configured to latch data values at its first and second data inputs to its first and second data outputs based upon assertion of the photon received signal;
  a fifth counter configured to count latching events of the third latch circuit during which the first data output of the third latch circuit is asserted; and a sixth counter configured to count latching events of the third latch circuit during which the second data output of the third latch circuit is asserted.

21. The time of flight ranging system of claim 20, wherein the third latch circuit has an enable input receiving the latch command signal; and wherein the third latch circuit is configured to latch in response to assertion of the latch command signal.

22. The time of flight ranging system of claim 21, further comprising a fifth AND gate performing a logical AND operation on the first data output of the third latch circuit and the toggle control signal to produce a third toggle signal;

wherein the fifth counter comprises a fifth ripple counter having a clock input receiving the third toggle signal;

further comprising a sixth AND gate performing a logical AND operation on the second data output of the third latch circuit and the toggle control signal to produce a complement of the third toggle signal; and wherein the sixth counter comprises a sixth ripple counter having a clock input receiving the complement of the third toggle signal.

23. The time of flight ranging system of claim 22, wherein the third latch circuit comprises:
   a fifth transmission gate having an input coupled to the first data input of the third latch circuit and an output coupled to the first data output of the third latch circuit, the fifth transmission gate configured to open in response to deassertion of the latch command signal and assertion of the complement of the latch command signal; and
   a sixth transmission gate having an input coupled to the second data input of the third latch circuit and an output coupled to the second data output of the third latch circuit, the sixth transmission gate configured to open in response to deassertion of the latch command signal and assertion of the latch command signal.

24. The time of flight ranging system of claim 23, wherein the third latch circuit further comprises:
   fifth and sixth CMOS inverters in a cross coupled arrangement with an input of the fifth CMOS inverter coupled to an output of the sixth CMOS inverter and with an input of the sixth CMOS inverter coupled to an output of the fifth CMOS inverter;
   a fifth enable circuit configured to control coupling of a supply voltage to supply terminals of the fifth and sixth CMOS inverters in response to deassertion of the complement of the latch command signal; and
   a sixth enable configured to control coupling of a ground voltage to ground terminals of the fifth and sixth CMOS inverters in response to assertion of the latch command signal;

wherein the output of the fifth CMOS inverter is the first data output of the third latch circuit; and wherein the output of the sixth CMOS inverter is the second data output of the third latch circuit.

25. The time of flight ranging system of claim 7, wherein the first latch circuit latches data values at its first and second data inputs to first and second data outputs;

further comprising a control signal generation block configured to generate a latch command signal by applying a delay to the photon received signal;

wherein the first latch circuit has an enable input receiving the latch command signal;

wherein the first latch circuit is configured to latch in response to assertion of the latch command signal;

wherein the control signal generation block is further configured to:
   generate a delayed latch command signal by applying a delay to the latch command signal; and
   generate a toggle control signal by performing a logical AND operation on the delayed latch command signal and the photon received signal;

further comprising a first AND gate performing a logical AND operation on the first data output and the toggle control signal to produce a toggle signal;

further comprising a first ripple counter having a clock input receiving the toggle signal;

further comprising a second AND gate performing a logical AND operation on the second data output and the toggle control signal to produce a complement of the toggle signal;

further comprising a second ripple counter having a clock input receiving the complement of the toggle signal;

wherein the control signal generation block is further configured to generate a complement of the latch command signal by applying a delay to a complement of the photon received signal; and wherein the first latch circuit comprises:
   a first p-channel transistor having a source coupled to a supply voltage;
   a first n-channel transistor having a drain coupled to a drain of the first p-channel transistor and a gate coupled to a gate of the first p-channel transistor;
   a third n-channel transistor having a drain coupled to a source of the first n-channel transistor, a source coupled to a tail node, and a gate;
   a second p-channel transistor having a source coupled to the supply voltage;
   a second n-channel transistor having a drain coupled to a drain of the second p-channel transistor and a gate coupled to a gate of the second p-channel transistor;
   a fourth n-channel transistor having a drain coupled to a source of the second n-channel transistor, a source coupled to the tail node, and a gate;
   wherein the gates of the third and fourth n-channel transistors are coupled to a first pair of differential timing references;
   a tail transistor coupled between the tail node and ground;
   a third p-channel transistor having a source coupled to the supply voltage, a drain coupled to the source of the first n-channel transistor, and a gate coupled to the latch command signal;
   a fourth p-channel transistor having a source coupled to the supply voltage, a drain coupled to the drain of the first p-channel transistor, and a gate coupled to the latch command signal;
   a fifth p-channel transistor having a source coupled to the supply voltage, a drain coupled to the source of the second n-channel transistor, and a gate coupled to the latch command signal;
   a sixth p-channel transistor having a source coupled to the supply voltage, a drain coupled to the drain of the second p-channel transistor, and a gate coupled to the latch command signal;
   a first inverter having an input coupled to the drains of the second and sixth p-channel transistors and an output forming the second data output; and a first inverter having an input coupled to the drains of the first and fourth p-channel transistor and an output forming the first data input.

26. A method of operating a time of flight ranging system, the method comprising:
asserting a photon received signal in response to detection of light that has reflected off a target and returned to the time of flight ranging system;
receiving a first pair of differential timing references at first and second data inputs of a first latch circuit; and
latching data values at the first and second data inputs of the first latch circuit to first and second data outputs of the first latch circuit based upon assertion of the photon received signal.

27. The method of claim 26, further comprising:
counting latching events of the first latch circuit during which the first data output is asserted; and
counting latching events of the first latch circuit during which the second data output is asserted.

28. The method of claim 26, wherein generating the photon received signal comprises performing an effective logical OR operation on outputs of each of a plurality of single photon avalanche diodes (SPADs).

29. The method of claim 26, further comprising emitting light at the target.

30. A method of operating a time of flight ranging system, the method comprising:
asserting a photon received signal in response to detection of light that has reflected off a target and returned to the time of flight ranging system;
receiving a first pair of differential timing references at first and second data inputs of a first latch circuit; and
latching data values at the first and second data inputs of the first latch circuit based upon assertion of the photon received signal.

31. The method of claim 30, further comprising:
counting latching events of the first latch circuit during which a first data output of the first latch circuit is asserted; and
counting latching events of the first latch circuit during which an inversion of the first data output is asserted.

32. The method of claim 30, wherein generating the photon received signal comprises performing an effective logical OR operation on outputs of each of a plurality of single photon avalanche diodes (SPADs).

33. The method of claim 30, further comprising emitting light at the target.

34. The method of claim 30, wherein the first pair of differential timing references are equal in amplitude but opposite in phase.

35. The method of claim 30, wherein the data values latched by the first latch circuit are values of the first pair of differential timing references received at the first and second data inputs.

36. The time of flight ranging system of claim 1, wherein the first pair of differential timing references are equal in amplitude but opposite in phase.

37. The time of flight ranging system of claim 1, wherein the data values latched by the first latch circuit are values of the first pair of differential timing references received at the first and second data inputs.

38. The method of claim 26, wherein the first pair of differential timing references are equal in amplitude but opposite in phase.

39. The method of claim 26, wherein the data values latched by the first latch circuit are values of the first pair of differential timing references received at the first and second data inputs.

* * * * *